United States Patent
Beller et al.

(10) Patent No.: US 12,397,780 B2
(45) Date of Patent: Aug. 26, 2025

(54) OBJECT DETERMINATION IN AN OCCLUDED REGION

(71) Applicant: Zoox, Inc., Foster City, CA (US)

(72) Inventors: Andrew E. Beller, San Francisco, CA (US); Clark Davenport, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 120 days.

(21) Appl. No.: 17/124,385

(22) Filed: Dec. 16, 2020

(65) Prior Publication Data
US 2022/0185267 A1 Jun. 16, 2022

(51) Int. Cl.
*B60W 30/09* (2012.01)
*B60W 30/095* (2012.01)
*B60W 50/00* (2006.01)
*B60W 60/00* (2020.01)
*G06V 20/58* (2022.01)

(52) U.S. Cl.
CPC ........ *B60W 30/09* (2013.01); *B60W 30/0956* (2013.01); *B60W 50/0097* (2013.01); *B60W 60/0015* (2020.02); *G06V 20/58* (2022.01); *B60W 2420/40* (2013.01); *B60W 2420/403* (2013.01); *B60W 2420/408* (2024.01); *B60W 2420/54* (2013.01); *B60W 2554/4029* (2020.02); *B60W 2554/4042* (2020.02); *B60W 2554/4043* (2020.02); *B60W 2554/4044* (2020.02)

(58) Field of Classification Search
CPC ............ B60W 30/09; B60W 60/0015; B60W 30/0956; B60W 50/0097; B60W 2554/4029; B60W 2554/4042; B60W 2554/4043; B60W 2554/4044; B60W 2420/40; B60W 2420/42; B60W 2420/52; B60W 2420/54; G06V 20/58
USPC ........................................................ 701/26
See application file for complete search history.

(56) References Cited

U.S. PATENT DOCUMENTS

2009/0303234 A1\* 12/2009 Becker ................... G01S 13/86
  348/46
2018/0231974 A1\* 8/2018 Eggert ................ B60W 30/085
(Continued)

FOREIGN PATENT DOCUMENTS

| DE | 102006034518 A1 \* | 1/2008 | .......... G01S 13/536 |
| DE | 102018129074 A1 | 5/2019 | |
| WO | WO2022009707 | 1/2022 | |

OTHER PUBLICATIONS

Weiwei Zhang, Part-Aware Region Proposal for Vehicle Detection in High Occlusion Environment, Jul. 17, 2019, IEEE Access, vol. 7 2019 (Year: 2019).\*

(Continued)

*Primary Examiner* — Matthias S Weisfeld
(74) *Attorney, Agent, or Firm* — Lee & Hayes, P.C.

(57) ABSTRACT

A vehicle computing device may implement techniques to predict behavior of objects or predicted objects in an environment. The techniques may include using a model to determine whether a potential object will emerge from an occluded region in the environment. The model may be configured to use one or more algorithms, classifiers, and/or computational resources to predict an intersection point and/or an intersection time between the potential object and the vehicle. Based on the predicted intersection point and/or the predicted intersection time, the vehicle computing device may control operation of the vehicle.

20 Claims, 7 Drawing Sheets

(56) References Cited

U.S. PATENT DOCUMENTS

| | | | |
|---|---|---|---|
| 2018/0345958 A1* | 12/2018 | Lo | G08G 1/096725 |
| 2020/0183011 A1* | 6/2020 | Lin | G01S 7/4808 |
| 2020/0225669 A1 | 7/2020 | Silva et al. | |
| 2020/0231149 A1* | 7/2020 | Eggert | G08G 1/166 |
| 2020/0249356 A1* | 8/2020 | Huang | G05D 1/0231 |
| 2020/0278681 A1 | 9/2020 | Gier et al. | |
| 2020/0341486 A1* | 10/2020 | Dia | G05D 1/0238 |
| 2021/0271249 A1* | 9/2021 | Kobashi | B60W 30/09 |
| 2021/0406679 A1* | 12/2021 | Wen | G06V 10/50 |
| 2022/0057232 A1* | 2/2022 | Shen | G01S 17/89 |
| 2022/0215673 A1* | 7/2022 | Fujiwara | G06V 20/58 |

OTHER PUBLICATIONS

Stephan G McGill, Probabilistic Risk Metrics for Navigating Occluded Intersections, Jul. 10, 2019, IEEE Robotics and Automation Letters (Year: 2019).*

The International Search Report and Written Opinion for PCT Application No. PCT/US21/60656, mailed Mar. 3, 2022, 11 pages.

* cited by examiner

OBJECT DETERMINATION IN AN OCCLUDED REGION

Planning systems in autonomous and semi-autonomous vehicles determine actions for a vehicle to take in an operating environment. Actions for a vehicle may be determined based in part on avoiding objects present in the environment. For example, an action may be generated to go around a bicycle, to change a lane to avoid another vehicle in the road, or the like. The planning systems may predict numerous possible behaviors for each detected dynamic object in the environment. However, in environments with numerous dynamic objects performing numerous predictions for each dynamic object may be computationally costly and, in some cases, impossible with onboard computing capabilities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
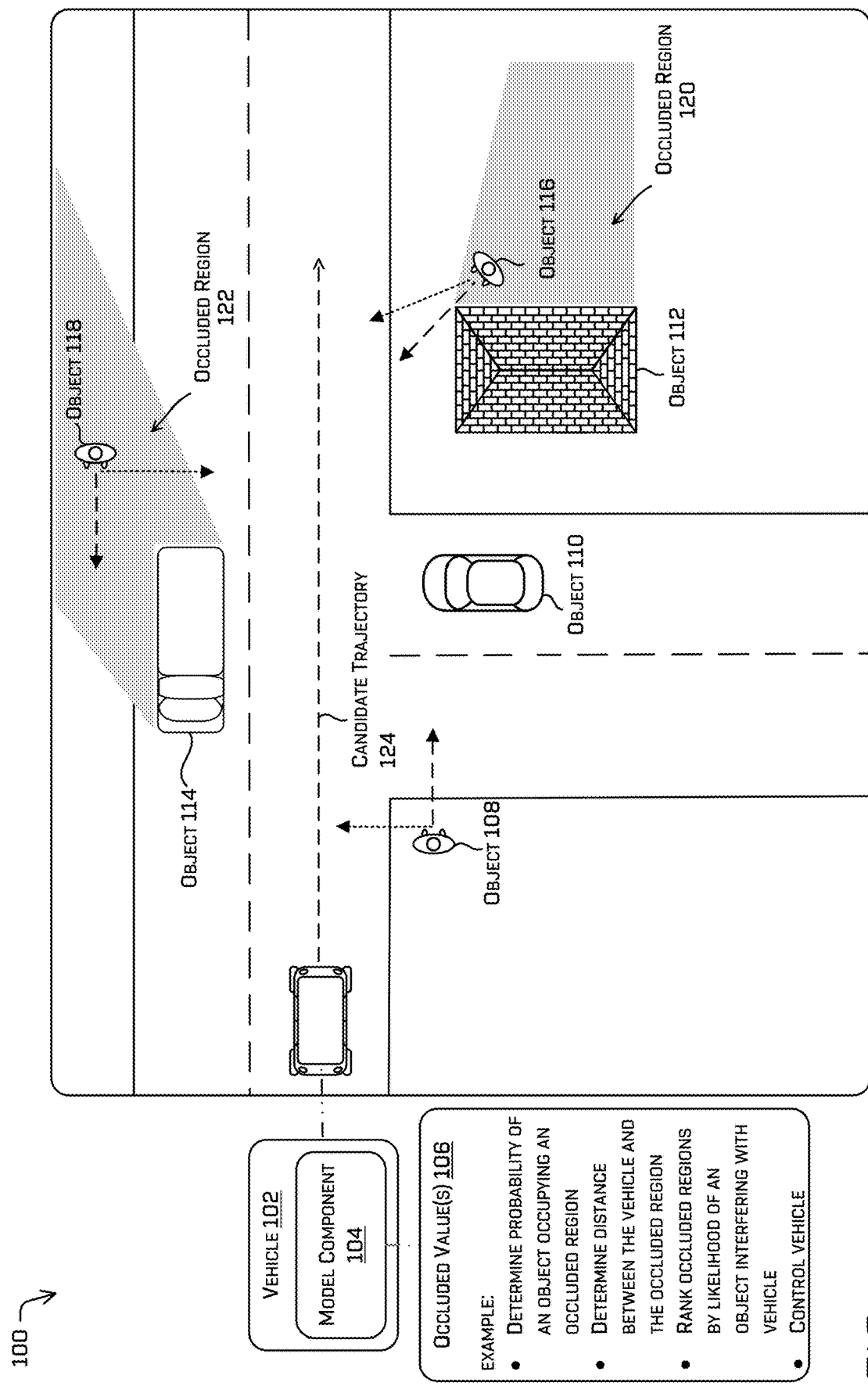
FIG. 1 is an illustration of an example environment, in which an example vehicle applies a model to predict behavior for an object in an occluded region.

Techniques for determining risk associated with occluded regions in an environment are discussed herein. For instance, an object within an occluded region may unexpectedly emerge requiring an action by a vehicle to avoid intersecting with the object. In some examples, a vehicle computing device may employ a model to determine a likelihood that an object exists in an occluded region and if it will emerge from the occluded region, and rank objects and/or occluded regions most likely to affect or impact operation of the vehicle. An output by the model can be used by the vehicle computing device to improve vehicle safety by planning for the possibility that the object may emerge from the occluded region quickly and/or unexpectedly at a point in time.

Portions of the environment may be obscured or otherwise occluded by an object or obstacle and may be referred to as occluded regions. Because of the lack of sensor data associated with an occluded region, it may be difficult to determine whether the occluded region is free of any objects or whether the occluded region is occupied by a static obstacle or a dynamic object such as a vehicle or pedestrian. Using the techniques as described wherein, a vehicle computing device can employ a model to identify occluded regions likely to be associated with an object that can intersect with a trajectory of the vehicle at a later time.

In some examples, a vehicle computing device may employ a model to receive sensor data usable to determine a discretized representation of an environment of a vehicle. The discretized representation can represent, for example, an occupancy grid that identifies areas of the environment that are occluded (e.g., areas difficult to "view" using sensors due to an obstacle such as a reflective surface, a building, another vehicle, a tree, and so on). For instance, the discretized representation can comprise one or more cells in which each cell comprises a probability of an object occupying the respective cell. The model can process data associated with the discretized representation is a variety of ways (e.g., downsampled data, fuse data, compare data to a threshold, etc.) to output occluded values indicating likelihoods for different occluded regions in the environment to include an object that, if it emerged at a later time, may interact with the vehicle.

In some examples, the model can determine a distance between a vehicle and an occluded region in the environment having a greatest likelihood to represent a risk to the vehicle (relative to another occluded region). The model may also or instead output velocity, orientation, and/or acceleration information associated with a potential object in the occluded region. The data output by the model can be used by the vehicle computing device to determine an action for the vehicle (e.g., control braking, steering, and/or acceleration systems of the vehicle) thereby avoiding the potential object in the occluded region.

By way of example and not limitation, the model can determine which occluded regions may comprise objects that may suddenly or unexpectedly intersect with the vehicle, and predict actions for the vehicle (e.g., a velocity range, braking range, and the like) to use relative to each of the occluded regions. For instance, the vehicle computing device may determine different levels or rates of caution (e.g., harder braking limits, greater accelerations limits, etc.) in the vicinity of an occluded region relative to another occluded region or non-occluded region.

In some examples, a model can receive sensor data from one or more sensors of a vehicle and determine a discretized representation of an environment based on the sensor data. In some examples, the model can downsample the discretized representation (e.g., change a resolution or amount of data associated with the discretized representation) and fuse, as a fused representation, the downsampled representation with another downsampled representation associated with a different time (e.g., a previous occlusion grid based on previous sensor data). In such examples, the model can identify one or more occluded regions in the fused representation that can potentially contain an object, such as a pedestrian. For each of the one or more occluded regions, the model can determine a potential position, velocity, and/or acceleration of an object in the occluded region usable to determine a potential intersection point and/or intersection time with a trajectory of the vehicle.

In some examples, the model can rank the occluded regions by a level of impact to the vehicle and/or identify the occluded region most likely to be associated with the soonest potential impact to the vehicle (e.g., an occluded region associated with the cells having the highest probabilities for an object to be present). In some examples, the model can determine which types of objects (e.g., a bicycle, a pedestrian, another vehicle, an animal, etc.) are likely to occupy an occluded region based at least in part on a type and/or a size of the occluded region. Using the techniques described herein, the model can determine a probability that one or more objects exist in and/or emerge from occluded regions, and can use the probability to determine an alternate trajectory for the vehicle that safely maneuvers past the object and/or the occluded region.

As mentioned above, the model may receive sensor data describing regions of an environment usable for determining and/or identifying a probability of an object occupying occluded regions. In some examples, the model can also receive a candidate trajectory (e.g., a trajectory from a planning component of the vehicle computing device) for the vehicle to follow in the environment at a future time. For occluded regions associated with probabilit(ies) that meet or exceed a threshold, the model can determine a distance between a closest point of each occluded region and a location of the vehicle along the candidate trajectory at the future time. In such examples, the model may compare the distances to a threshold distance to identify which occluded regions are associated with distances that are below a threshold distance. Occluded regions associated with distances from the vehicle that are below the threshold distance may be considered by the vehicle computing device during control of the vehicle (e.g., during planning and/or perception operations). Accordingly, the vehicle can plan an action for a vehicle to follow based at least in part on data provided by the model that indicates the closest and/or potentially most impactful occluded region(s) to the vehicle.

In some examples, the model may predict a velocity and/or a trajectory (e.g., direction, speed, acceleration, etc.) for an object that may potentially emerge from the occluded region in the environment, and control the vehicle based at least in part on the object velocity and/or trajectory. For instance, the model may determine a velocity for the object based at least in part on a type of the object (e.g., a pedestrian may be associated with a predetermined velocity different from a predetermined velocity associated with a vehicle in an occluded region). The model may also or instead predict an object type based at least in part on a size of an occluded region. For instance, a size of the occluded region can be compared by the model to an average size for different objects to filter out occluded regions that are too small for a particular object to occupy. In some examples, a larger occluded region that can comprise an object such as another vehicle may represent more risk to the vehicle than a smaller occluded region that can comprise a pedestrian since the other vehicle can emerge from the occlude region with a higher predetermined acceleration than a predetermined acceleration of the pedestrian.

In various examples, the model can determine an intersection point and/or an intersection time between the vehicle and an object predicted to occupy occluded region(s). In some examples, a size of such an occluded region may be determined to be above a size threshold (e.g., a minimum size required for an object of a certain type to occupy the region). In other words, the model can determine which objects can fit into different occluded regions and predict distance data, velocity data, acceleration data, and so on, of the object that may emerge from the occluded region at a future time.

The values predicted by the model may represent an action of the object that has the potential to most affect or impact operation of the vehicle (e.g., intersect a trajectory of the vehicle, cause the vehicle to swerve or brake hard, etc.). By way of example and not limitation, the model may predict a direction that an object can emerge from an occluded region, and determine a distance from the object in the occluded region to the vehicle based at least in part on characteristics of the object type (e.g., maximum acceleration, maximum velocity, location in the occluded region, and so on).

In some examples, an output predicted by the model may be based on an output of a cost function or based on temporal logic (e.g., linear temporal logic, signal temporal logic, etc.).

In various examples, the model can determine risk for an occluded region (e.g., a likelihood for an occluded region to have an object, an intersection time and/or an intersection point between the vehicle and the object at a future time) based at least in part on features of the object comprising one or more of: a predetermined lateral acceleration, a predetermined longitudinal acceleration, a predetermined vertical acceleration, a predetermined speed, or a predetermined change in direction for a given speed.

In some examples, the likelihood of occurrence and/or the magnitude of impact to operation of the vehicle for each occluded region may be based at least in part on a type and/or a size of the occluded region. For instance, a type of occluded region can comprise a wall, a building, another vehicle, a group of pedestrians, or any other type of obstacle or object that is capable of blocking line of sight from the vehicle. Some types of occluded regions are less likely for an object to occupy than others and the model may associate occluded regions unsuited for containing an object with a lower probability of having an object within its boundary. In some examples, the occluded regions can be ranked by the model based at least in part on their respective probabilities, and the ranked occluded region information can be sent to a vehicle computing device configured to determine an action for the vehicle.

In some examples, the vehicle computing device may control operation of the vehicle based at least in part on an output by the model to achieve different levels of acceleration, braking, and/or steering. For instance, outputs from the model can be used to associate with different acceleration, braking, and/or steering thresholds for the vehicle in the vicinity of the occluded region. For instance, the vehicle computing device can determine a trajectory for the vehicle to keep acceleration and deceleration within certain thresholds (e.g., to minimize the cost function) and/or apply one or more relaxed thresholds (e.g., harder braking, higher lateral acceleration, etc.) to avoid collision in the event that the object enters a path of the vehicle. In this way, the vehicle can plan routes that are not overly cautious (e.g., that allow the vehicle to effectively pass dynamic objects in the environment).

Generally, the output of the model(s) may be used by a vehicle computing device (e.g., a planning component of the vehicle computing device) to control operation of the vehicle. Predictions from model(s) that take into consideration adverse object behavior may be provided to a planning component of the vehicle computing device to improve how the vehicle navigates (e.g., avoids and/or interacts with objects) in the environment. In some examples, controlling operation of the vehicle may comprise the vehicle computing device implementing different latency threshold(s) (e.g., an amount of time to detect, plan, and implement a reaction to an event occurring in real-time). In some examples, a latency threshold may be implemented by the vehicle computing device to specify an amount of time from predicting an object within an occluded region to engaging braking, acceleration, and/or steering.

As described herein, models may be representative of machine learned models, statistical models, or a combination thereof. That is, a model may refer to a machine learning model that learns from a training data set to improve accuracy of an output (e.g., a prediction). Additionally, or alternatively, a model may refer to a statistical model that is representative of logic and/or mathematical functions that generate approximations which are usable to make predictions.

The techniques discussed herein may improve a functioning of a vehicle computing device in a number of ways. Traditionally, in control planning for an autonomous vehicle, a vehicle computing device may detect an object in an environment and may determine an action for the autonomous vehicle to take based on the detected objects. However, performing numerous predictions for possible vehicle trajectories during planning considerations (e.g., trajectory determinations, calculations, etc.) can be extremely computationally expensive, particularly when there are numerous objects in an environment that may behave in infinitely unexpected ways. By performing occluded region prediction techniques as described herein, computational load to predict potential interaction between objects and the vehicle is reduced by considering the objects likelihood for occupying an occluded region, thereby improving the functioning of the vehicle computing device.

The techniques discussed herein may also improve a functioning of a vehicle computing device by receiving predictions from a model that provides additional detail for objects in occluded regions. In some examples, the vehicle computing device may improve safety by determining an object that represents an adverse action for the object to impact the safety of the vehicle. As a result, the vehicle computing device can control operation of the vehicle by utilizing planning considerations from the models that are more detailed and have a finer granularity than traditional planning considerations that predicted actions of objects without specifically taking into account an adverse action by the object in an occluded region. In various examples, determining the adverse action by an object can be based on dynamics which minimizes computational processing required to predict the adverse action by the object. Thus, the techniques discussed herein may improve a functioning of a vehicle computing device by reducing computational resources (e.g., repurposing available computational resources) used to predict potential actions for objects in the environment of the vehicle.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a manually driven vehicle, a sensor system, or a robotic platform), and are not limited to autonomous vehicles. In another example, the techniques may be utilized in an aviation or nautical context, or in any system using machine vision (e.g., in a system using sensor data).

FIG. 1 is an illustration of an example environment 100, in which an example autonomous vehicle (vehicle 102) applies a model component 104 to predict occluded value(s) 106 that represent a likelihood of an object in an occluded region impacting the vehicle 102.

In various examples, a vehicle computing device associated with the vehicle 102 may be configured to detect one or more objects (e.g., objects 108, 110, 112, 114, 116, and 118) in the environment 100, such as via a perception component. In some examples, the vehicle computing device may detect the objects, based on sensor data received from one or more sensors. In some examples, the sensors may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like.

In some examples, the sensors may include one or more remote sensors, such as, for example sensors mounted on another autonomous vehicle, and/or sensors mounted in the environment 100. In various examples, the vehicle 102 may be configured to transmit and/or receive data from other autonomous vehicles and/or the sensors. The data may include sensor data, such as data regarding the objects detected in the environment 100. In some examples, the sensors may be mounted in the environment 100 to provide additional visibility in an area of reduced visibility, such as, for example, the occluded region 120 and/or the occluded region 122.

In various examples, the vehicle computing device can receive the sensor data and can semantically classify the detected objects (e.g., determine an object type), such as, for example, whether the object is a pedestrian, such as objects 108, 116, and 118, a vehicle such as object 110, a building such as object 112, a truck such as object 114, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model to determine object characteristics (e.g., maximum speed, acceleration, maneuverability, etc.). In this way, potential actions by an object in an occluded region may be considered based on characteristics of the object (e.g., how the object may potentially move in the environment).

As depicted in FIG. 1, the environment 100 includes occluded region 120 and occluded region 122. In the example environment 100, the building 112 and the truck 114 at least partially block areas that the vehicle 102 is unable to detect using line of sight sensors. For example, the example environment 100 depicts the building 112 at least partially causing the occluded region 120 and the truck 114 at least partially causing the occluded region 122.

In some examples, the vehicle computing device can predict a candidate trajectory 124 for a vehicle navigating in the environment 100, and motion of the vehicle 102 can be simulated along the candidate trajectory 124 to determine predicted occluded regions associated with the candidate trajectory 124. For example, positions of the vehicle 102 along the candidate trajectory 124 in the future can be determined relative to a point associated with the occluded region 120 and the occluded region 122. Notably, the object 116 and the object 118 can be considered potential objects that may emerge from the respective occluded region and intersect with the vehicle 102 at the future time.

The vehicle 102 can employ the model component 104 comprising a model to predict occluded value(s) 106 that represent a likelihood of the object 116 associated with the occluded region 120 and/or the object 118 associated with the occluded region 120 impacting the vehicle 102 (e.g., cause the vehicle 102 to take an action to avoid intersecting with the object). In some examples, the model component 104 (e.g., also referred to as "the model") can receive sensor data describing the environment 100 and determine, based at least in part on the sensor data, a discretized representation of the environment 100. As explained further in FIG. 3 and elsewhere, the discretized representation can represent an occupancy grid indicating a probability that an object occupies an occluded region.

In some examples, the model can compare a first probability of the object 116 occupying the occluded region 120 and/or a second probability of the object 118 occupying the occluded region 120 to a threshold value. The model can also determine whether the probabilities meet or exceed the threshold value, and identify a subset of the occluded regions for additional processing. Additionally, some occluded regions may be associated with cells having an object that is unable to access the vehicle, and the model can assign a probability to the cell to indicate a likelihood of an object being present based at least in part on accessibility of the cell relative to the vehicle.

In some examples, the model can receive the candidate trajectory 124 and determine a location of the vehicle 102 along the candidate trajectory 124 at a future time. In various examples, the model can determine a distance between a closest point of the occluded region 120 and/or the occluded region 122, and the location of the vehicle along the candidate trajectory at the future time. The model, in such examples, can compare the determined distances to a threshold distance to identify if the occluded region 120 and/or the occluded region 122 are associated with distances below a threshold distance. Occluded regions associated with distances from the vehicle that are below the threshold distance may be considered by the vehicle computing device during control of the vehicle (e.g., during planning and/or perception operations). Accordingly, the vehicle 102 can plan an action at the future time based at least in part on data output by the model that indicates the closest and/or most impactful occluded region(s) to the vehicle 102.

In some examples, the model can determine a distance between an occluded region (e.g., the occluded region 120 and/or the occluded region 122) and a location of the vehicle 102 along the candidate trajectory 124, and further determine a maximum velocity for an object in the occluded region (e.g., the distance can be based on using the maximum velocity). However, in other examples, the model can determine one or more of a time, a velocity, and/or a distance to intersection between the object and the vehicle.

As illustrated in FIG. 1, the occluded value(s) 106 represent a probability of an object occupying the occluded regions (e.g., the occluded region 120 and the occluded region 122), a distance between the vehicle and one or more occluded regions (e.g., based on a distance threshold), and/or a ranking of the occluded regions based at least in part on likelihoods of an object emerging from the occluded region to interfere with the vehicle 102.

In some examples, the vehicle computing device can control the vehicle 102 based at least in part on the output data from the model component 104. For instance, the occluded value(s) 106 can be used by a perception component or a planning comment of the vehicle computing device to cause an action that safely navigates in the vicinity of the occluded region 120 and the occluded region 122.

In some examples, the model may predict a velocity and/or a trajectory (e.g., direction, speed, acceleration, etc.) for an object that may potentially emerge from the occluded region in the environment and control the vehicle based at least in part on the object velocity and/or trajectory. For instance, the model may determine a velocity for the object based at least in part on a type of the object (e.g., a pedestrian may be associated with a predetermined velocity different from a predetermined velocity associated with a vehicle in an occluded region). The model may also or instead predict an object type based at least in part on a size of an occluded region. For instance, a size of the occluded region can be compared by the model to an average size for different objects to filter out occluded regions that are too small for a particular object to occupy.

In some examples, the model can predict an object and/or an object type to be near and/or within an occluded region based at least in part on previous object detections in proximity to the occluded region (by our vehicle or historically by other previous vehicles).

In various examples, the model can determine an intersection point and/or an intersection time between the vehicle and an object predicted to occupy occluded region(s). In some examples, a size of such an occluded region may be determined to be above a size threshold (e.g., a minimum size required for an object of a certain type to occupy the region). In other words, the model can determine which objects can fit into different occluded regions and predict distance data, velocity data, acceleration data, and so on for the object to emerge from the occluded region at a future time regardless of object type.

In some examples, a prediction output by the model component 104 may capture potential uncertainty or adversarial behavior (e.g., a behavior most likely to affect or impact operation of the vehicle) of an object predicted to occupy an occluded region. For instance, the model can determine an adverse behavior of the pedestrian 118 (e.g., a maximum velocity, an exit point from the occluded region 122, etc.), and determine occluded value(s) 106 usable by the vehicle computing device to control the vehicle.

In various examples, the predictions by model component 104 (or respective models associated therewith) may be trained utilizing one or more machine learned algorithms. Additionally, or in the alternative, the model may utilize heat maps, tree search methods, and/or temporal logic formulas to determine probabilities of an object in an occluded region intersecting with the vehicle 102.

In various examples, the model component 104 may utilize machine learned techniques to determine the occluded value(s) 106. In such examples, machine learned algorithms may be trained to determine likelihoods of objects in an occluded region, a distance between an occluded region and the vehicle, a distance between an object within an occluded region and the vehicle, and so on. By implementing a model as described herein, the vehicle 102 may plan for objects (e.g., the object 116 and the object 118) that may appear from an occluded region with little or no notice (e.g., the pedestrian runs out from the occluded region 122 into the roadway).

Additional details of predicting occupancy of an occluded region are described in U.S. patent application Ser. No. 16/399,743, filed Apr. 30, 2019, entitled "Predicting an Occupancy Associated With Occluded Region," which is incorporated herein by reference. Additional details of determining occupancy of an occluded region are described in U.S. patent application Ser. No. 16/289,397, filed Feb. 28, 2019, entitled "Determining Occupancy of Occluded Regions," which is incorporated herein by reference. Additional details of controlling a vehicle based on occluded regions in an environment are described in U.S. patent application Ser. No. 16/011,436, filed Jun. 18, 2018, entitled "Occlusion Aware Planning and Control," which is incorporated herein by reference. Additional details of evaluating trajectories based on predicted occluded regions associated with the trajectories are described in U.S. patent application Ser. No. 16/246,208, filed Jan. 11, 2019, entitled "Occlusion Prediction and Trajectory Evaluation," which is incorporated herein by reference.

Figure 2:
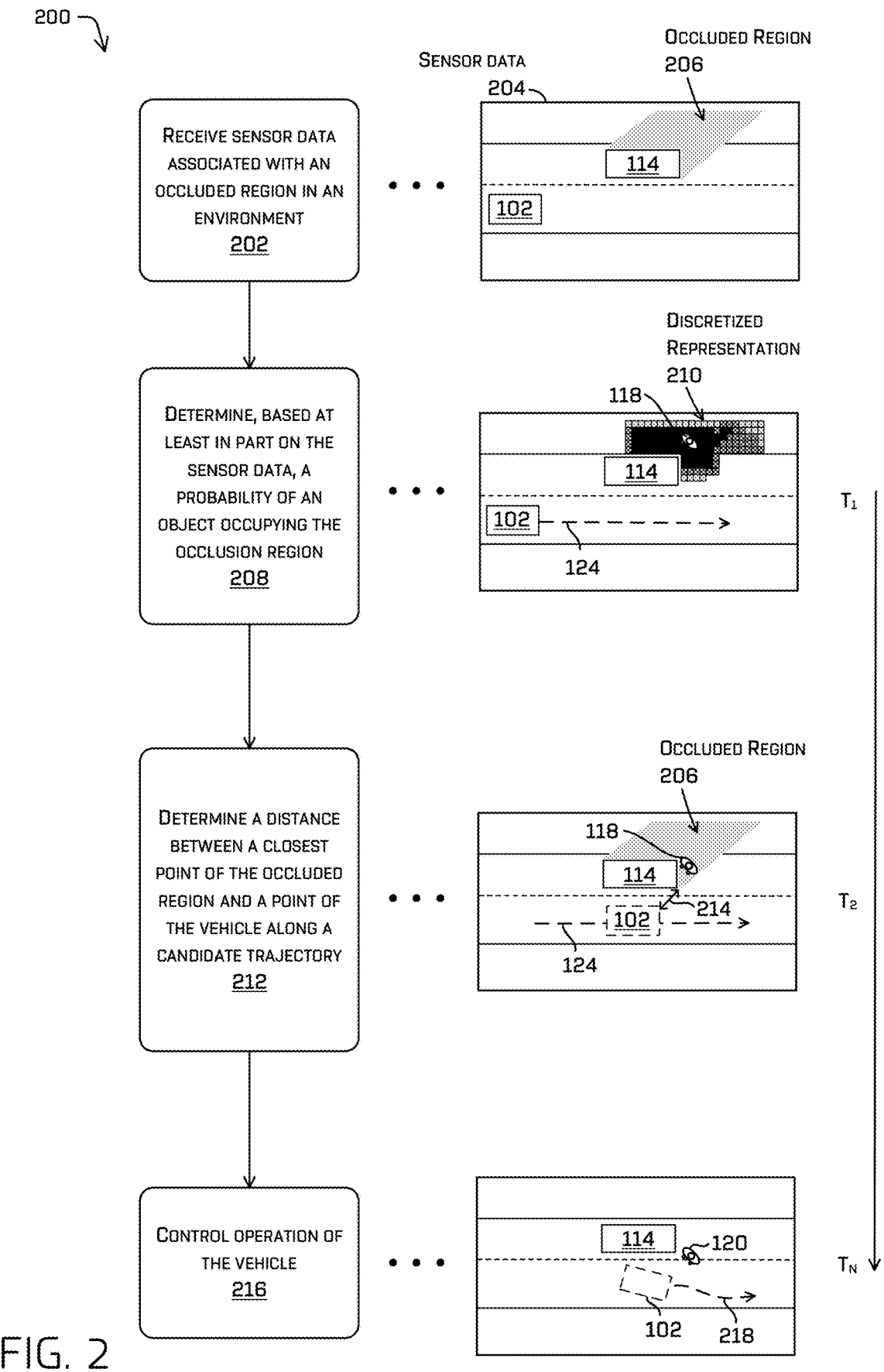
FIG. 2 is a pictorial flow diagram of an example process for controlling a vehicle based on a probability of an object occupying an occluded object.

FIG. 2 is a pictorial flow diagram of an example process 200 for controlling a vehicle (e.g., vehicle 102 or vehicle 502) based on occlusion values output from a model. The example process 200 may be implemented by a vehicle computing device (e.g., the vehicle computing device 504 of FIG. 5).

An operation 202 can include receiving sensor data associated with an occluded region in an environment. For example, the operation 202 can include the vehicle 102 receiving sensor data 204 representing the environment 100 which includes an occluded region 206. In some examples, the operation 202 can include receiving sensor data from a plurality of sensors associated with the vehicle 102 and/or sensors remote from the vehicle 102 (e.g., sensors located in the environment 100 and/or another vehicle). In some examples, the operation 202 can be performed by an autonomous vehicle as it traverses the environment 100. For instance, FIG. 2 illustrates time $T_1, T_2, \ldots, T_N$ (where N is an integer) to indicate a sequence of time among the operations.

An operation 208 can include determining, based at least in part on the sensor data, a probability of an object occupying the occlusion region. For example, the operation 208 can include the vehicle 102 implementing the model component 104 to determine a discretized representation 210 that comprises prediction probabilities indicating portions of the environment 100 likely to include an object. FIG. 2 shows the discretized representation 210 corresponding generally to the occluded region 206, though in other examples the discretized representation 210 may also represent regions that are not occluded. Further description of discretized representations can be found in FIG. 3 and elsewhere.

In some examples, the discretized representation 210 can comprise cells associated with a different probabilities for whether or not an area of the cell comprises an object. FIG. 2 shows shading in the discretized representation 210 to convey the prediction probabilities for each cell. For instance, darker shading may indicate a stronger likelihood that an object occupies the cell, hence, the object 118 may be more likely to be located in the occluded region 206.

In some examples, the operation 208 can include the model component 104 receiving, at a first time $T_1$, the candidate trajectory 124 for the vehicle 102 to follow at a later time $T_2$.

An operation 212 can include determining a distance 214 between a closest point in the occluded region and a point of the vehicle along the candidate trajectory 124. For example, the operation 212 can include the vehicle 102 implementing the model component 104 to determine the distance 214 between a closest point of the occluded region 206 and the vehicle 102 at time $T_2$. In some examples, the distance 214 may be determined based at least in part on a probability that the object 118 in the occluded region 206 meets or exceeds a threshold value. An output (e.g., the occluded value(s) 106) by the model component 104 can include information about the distance 214 as well as information indicating a level of risk associated with the occluded region 206.

An operation 216 can include controlling operation of the vehicle. For example, the operation 216 can include a vehicle computing device receiving an output (e.g., output values 106) from the model component 104 and determining an alternate trajectory 218 for the vehicle to follow. In this way, the vehicle computing device can use the output to determine a level of caution for the vehicle 102 that is appropriate for the risk associated with a particular occluded region (e.g., the vehicle 102 can prepare for the object 118 to emerge from the occluded region 206 or no longer be occluded due to the vehicle movement).

In some examples, the operation 216 can include the vehicle computing device determining a level of caution (e.g., a caution flag and/or a sub-goal) along the candidate trajectory 124. In some examples, the vehicle computing device may control operation of the vehicle based at least in part on an output by the model to achieve different levels of acceleration, braking, and/or steering. For instance, outputs from the model can be used to associate with different acceleration, braking, and/or steering thresholds (e.g., sub-goals, levels of caution, etc.) for the vehicle in the vicinity of the occluded region. For instance, a planning component of the vehicle computing device can apply one or more relaxed thresholds (e.g., harder braking, higher lateral acceleration, etc.) to avoid collision in the event that the object enters a path of the vehicle.

Figure 3:
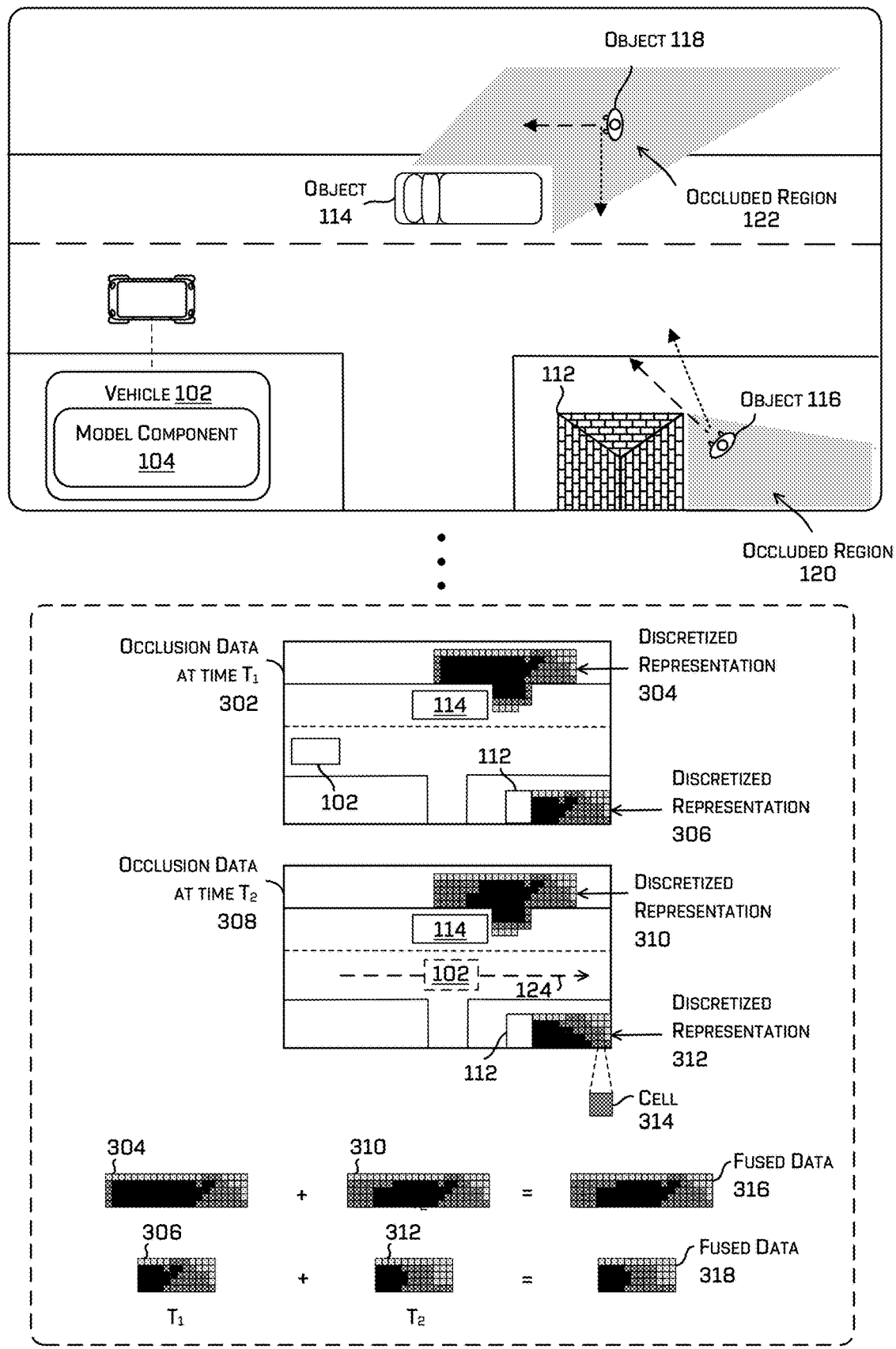
FIG. 3 is a pictorial diagram illustrating an example implementation to determine a discretized representation of an example environment.

FIG. 3 is a pictorial diagram illustrating an example implementation to determine a discretized representation of an example environment (e.g., the environment 100). The example implementation may be implemented by a vehicle computing device (e.g., the vehicle computing device 504 of FIG. 5).

In some examples, the vehicle computing device can employ the model component 104 to determine occlusion data 302 comprising discretized representation 304 representing the occluded region 122 and discretized representation 306 representing the occluded region 120 associated with time $T_1$. The occlusion data 308 may be determined based at least in part on sensor data received from one or more sensors. The discretized representation 304 and the discretized representation 306 may, in some examples be associated with a single discretized representation of the environment.

In various examples, the model component 104 can determine occlusion data 308 comprising discretized representation 310 and discretized representation 312 associated with time $T_2$ (e.g., a time after time $T_1$).

The discretized representations 304, 306, 310, and 312 comprise cells (e.g., cell 314) representing the environment. The cell 314, for instance, can comprise or otherwise be associated with a probability that an object occupies the cell 314. Shading in FIG. 3 represents different probabilities associated with cells, which can change from time $T_1$ to $T_2$ depending at least in part upon a location of the vehicle 102 (and a new position of the associated sensors). In some examples, probabilities associated with cells can be based at least in part on accessibility of the cell to the vehicle, a size of the cell, and other factors as discussed herein.

In various examples, the model component 104 can identify cells having a probability that meets or exceeds a threshold, and associate the cells with the occluded region 120 and/or the occluded region 122. The model component 104 can also or instead determine one of the occluded region 120 or the occluded region 122 a closest and/or most likely occluded region to include an object that can potentially impact the vehicle 102. For example, the model component 104 can output occluded values indicating a likelihood that an object in the occluded region 120 or the occluded region 122 will impact operation of the vehicle 102.

In some examples, the model component 104 can fuse the occlusion data 302 associated with time $T_1$ and the occlusion data 304 associated with time $T_2$. For example, the discretized representation 304 and the discretized representations 310 may be combined as fused data 316, and discretized representation 306 and discretized representations 312 may be combined as fused data 318. The fused data 316 and the fused data 318 represents combined probabilities associated with cells (e.g., a change in a probability associated with each cell from time $T_1$ to $T_2$).

In various examples, a discretized representation (e.g., an occlusion grid) associated with a first time may be combined, as the fused data 316, with another discretized representation (e.g., another occlusion grid) associated with a second time after the first time. For example, the discretized representation associated with the first time can represent a statistical accumulation of the discretized representation over time. In some examples, the model can assign weights to the earlier discretized representation and the current discretized representation, and combine, the discretized representations based at least in part on the respective weights. By way of example and not limitation, the model can combine assign a higher weight to a current discretized representation relative to an earlier discretized representation to incorporate some historical information into the model in a computationally efficient manner.

In some examples, regions in the environment that potentially contain an object can be represented by cells. In some examples, multiple cells may be associated with an occluded region, such as the cells in the discretized representation 304 overlapping an area of the occluded region 122. In such examples, the model component 104 can determine a likelihood that the occluded region 122 comprises an object based at least in part on the probabilities associated with the cells that are included in the occluded region 122.

In some examples, the model component 104 can determine a likelihood that an occluded region (e.g., the occluded region 120 and/or the occluded region 122) comprises an object based at least in part on the fused data 316 and/or the fused data 318. For instance, the fused data 316 or the fused data 318 can identify adjoining cells over a threshold as a region representing a location that the object 118 (e.g., the pedestrian 118) can hide. In some examples, the model component 104 can determine a position of the pedestrian 118 within the occluded region (e.g., based at least in part on the probabilities or combined probabilities associated with the cells within the occluded region 122).

Figure 4:
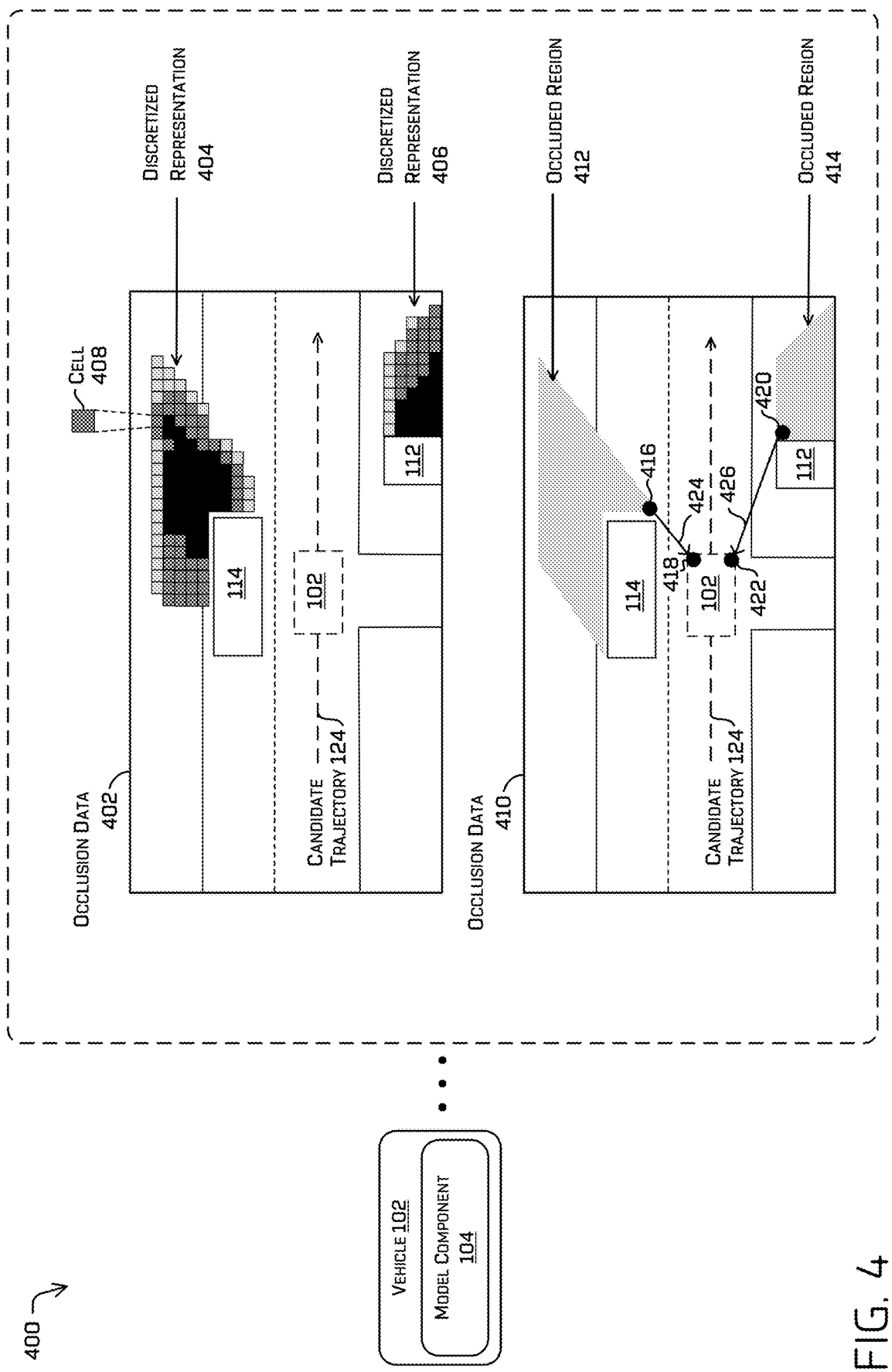
FIG. 4 is a pictorial diagram illustrating an example implementation to determine a distance between an occluded region and a vehicle based on an example discretized representation.

FIG. 4 is a pictorial diagram illustrating an example implementation 400 to determine a distance between an occluded region and a vehicle based on an example discretized representation. The example implementation 400 may be implemented by a vehicle computing device (e.g., the vehicle computing device 504 of FIG. 5).

In some examples, the vehicle computing device can employ the model component 104 to determine occlusion data 402 comprising a discretized representation 404 and a discretized representation 406. The occlusion data 402 may be determined based at least in part on sensor data received from one or more sensors. In various examples, the discretized representation 404 and the discretized representation 406 comprise cells (e.g., cell 408) that are associated with probabilities that an object is associated with the respective cell. In some examples, the occlusion data 402 may include the occlusion data 304 associated with time $T_2$ in FIG. 3.

FIG. 4 also depicts occlusion data 410 comprising occluded region 412 and occluded region 414. In various examples, the model component 104 can identify cells associated with the discretized representation 404 and/or the discretized representation 406 that correspond to the occluded region 412 and the occluded region 414. In some examples, the model component 104 can compare probabilities of an object being associated with a cell to a threshold value, and associate cells that meet or exceed the threshold value with the occluded region 412 and/or the occluded region 414. In this way, the model component 104 can identify potential objects that may occupy an occluded region based at least in part on a combination of probabilities associated with cells overlapping with the occluded region 412 and/or the occluded region 414. In some examples, the model component 104 can determine a likelihood that the occluded region 414 and/or the occluded region 414 comprise an object based at least in part on the probabilities associated with the cells that are included in the occluded region 412 and/or the occluded region 414.

FIG. 4 also depicts the model component 104 determining a closest point 416 of the occluded region 412 relative to a point 418 of the vehicle 102 along the candidate trajectory 124, and a closest point 420 of the occluded region 412 relative to a point 422 of the vehicle 102 along the candidate trajectory 124. The model component 104 may also or instead determine a distance 424 between the closest point 416 of the occluded region 412 and the point 418 of the vehicle 102, and a distance 426 between the closest point 420 of the occluded region 414 and the point 422 of the vehicle 102. In various examples, the model component 104 can compare the distance 424 to the distance 426 and determine, as an output, which of the point 416 or the point 420 is closest to the vehicle 102. In some examples, distance information (e.g., data indicating the distance 424 and the distance 426) associated with an occluded region(s) (e.g., the occluded region 412 and/or the occluded region 414) can be used by a vehicle computing device to determine an action (e.g., modify a braking or acceleration threshold when the vehicle approaches a vicinity of the occluded region 412 and/or the occluded region 414).

In some examples, the model component 104 may determine a trajectory (e.g., direction, speed, acceleration, etc.) for an object that may potentially emerge from the occluded region 412 and/or the occluded region 414. In some examples, the model component 104 may determine the trajectory for the object from a position at or near the point 416 of the occluded region 412 and/or the point 420 of the occluded region 414, to the vehicle 102.

In various examples, the model component 104 can output values indicating a likelihood that an object in the occluded region 412 and/or the occluded region 414 will impact operation of the vehicle 102 (e.g., by emerging from the respective occluded region).

While described as a separate system, in some examples, techniques to determine risk associated with occluded regions described herein in relation to FIGS. 1-4 may be implemented by other vehicle systems, components, and/or computing devices. For example, and as will be described in further detail with regard to FIG. 5, the prediction techniques described herein in relation to FIGS. 1-4 may be implemented at least partially by or in association with a perception component, a planning component, and/or a model component of FIG. 5.

Figure 5:
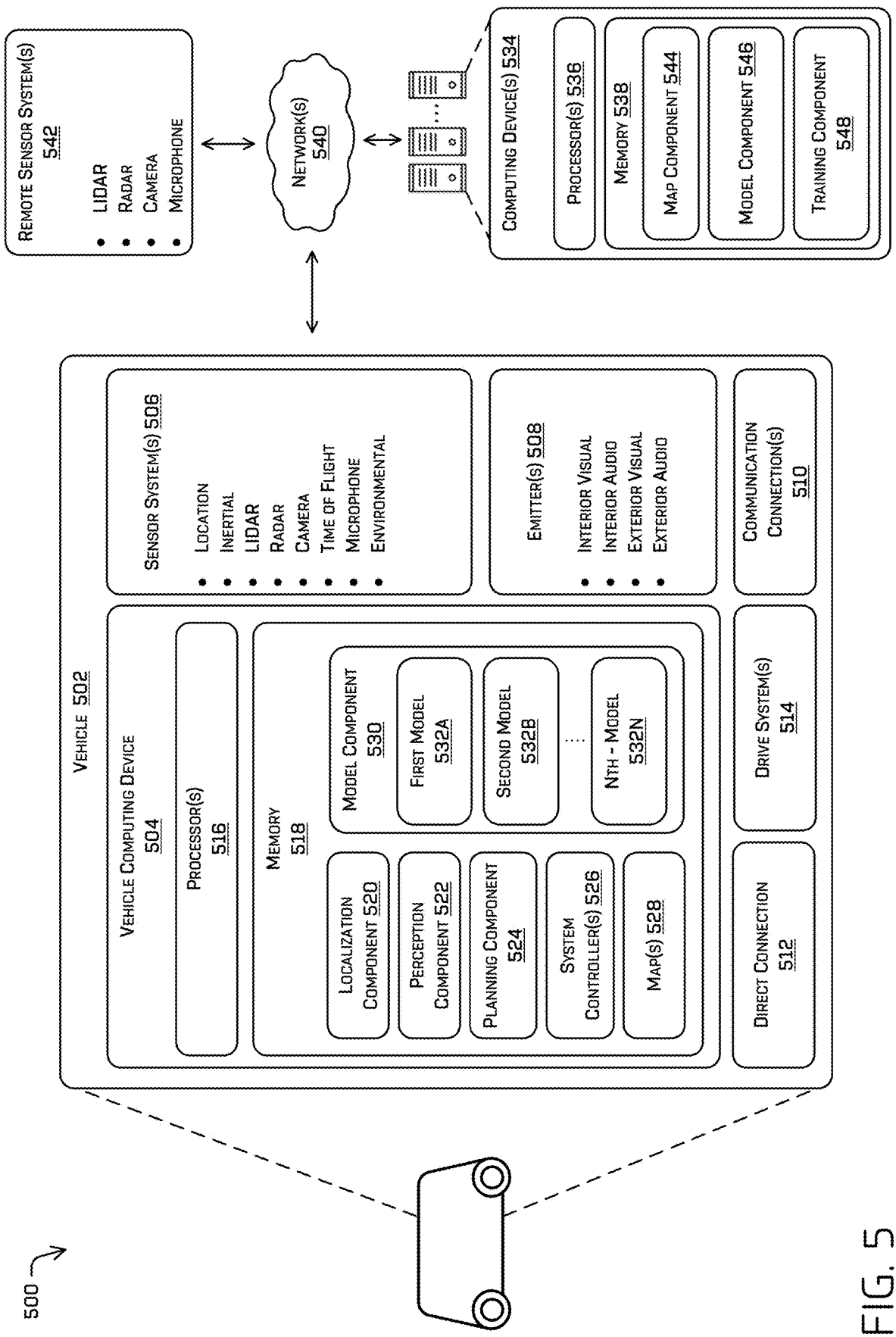
FIG. 5 is a block diagram of an example system for implementing the techniques described herein.

FIG. 5 is a block diagram of an example system 500 for implementing the techniques described herein. In at least one example, the system 500 may include a vehicle, such as vehicle 502.

The vehicle 502 may include a vehicle computing device 504, one or more sensor systems 506, one or more emitters 508, one or more communication connections 510, at least one direct connection 512, and one or more drive system(s) 514.

The vehicle computing device 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In various examples, the vehicle computing device 504 may store sensor data associated with actual location of an object at the end of the set of estimated states (e.g., end of the period of time) and may use this data as training data to train one or more models. In some examples, the vehicle computing device 504 may provide the data to a remote computing device (i.e., computing device separate from vehicle computing device such as the computing device(s) 534) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference.

In the illustrated example, the memory 518 of the vehicle computing device 504 stores a localization component 520, a perception component 522, a planning component 524, one or more system controllers 526, one or more maps 528, and a model component 530 including one or more model(s), such as a first model 532A, a second model 532B, up to an Nth model 532N (collectively "models 532"), where N is an integer. Though depicted in FIG. 5 as residing in the memory 518 for illustrative purposes, it is contemplated that the localization component 520, a perception component 522, a planning component 524, one or more system controllers 526, one or more maps 528, and/or the model component 530 including the model(s) 532 may additionally, or alternatively, be accessible to the vehicle 502 (e.g., stored on, or otherwise accessible by, memory remote from the vehicle 502, such as, for example, on memory 538 of a remote computing device 534).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 528 and/or map component 544, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 524 may include a prediction component to generate predicted trajectories of objects (e.g., objects) in an environment and/or to generate predicted candidate trajectories for the vehicle 502. For example, a prediction component may generate one or more predicted trajectories for objects within a threshold distance from the vehicle 502. In some examples, a prediction component may measure a trace of an object and generate a trajectory for the object based on observed and predicted behavior.

In at least one example, the vehicle computing device 504 may include one or more system controllers 526, which may be configured to control steering, propulsion, braking, safety, emitters, communication, and other systems of the vehicle 502. The system controller(s) 526 may communicate with and/or control corresponding systems of the drive system(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 528. That is, the map(s) 528 may be used in connection with the localization component 520, the perception component 522, and/or the planning component 524 to determine a location of the vehicle 502, detect objects in an environment, generate routes, determine actions and/or trajectories to navigate within an environment.

In some examples, the one or more maps 528 may be stored on a remote computing device(s) (such as the computing device(s) 534) accessible via network(s) 540. In some examples, multiple maps 528 may be stored based on, for example, a characteristic (e.g., type of entity, time of day, day of week, season of the year, etc.). Storing multiple maps 528 may have similar memory requirements, but increase the speed at which data in a map may be accessed.

As illustrated in FIG. 5, the vehicle computing device 504 may include a model component 530. The model component 530 may be configured to perform the functionality of the model component 104, including predicting a likelihood of an object occupying an occluded region, such as objects 116 and 118 of FIG. 1. In various examples, the model component 530 may receive one or more features associated with the detected object(s) from the perception component 522 and/or from the sensor system(s) 506. In some examples, the model component 530 may receive environment characteristics (e.g., environmental factors, etc.) and/or weather characteristics (e.g., weather factors such as snow, rain, ice, etc.) from the perception component 522 and/or the sensor system(s) 506. While shown separately in FIG. 5, the model component 530 could be part of the planning component 524 or other component(s) of the vehicle 502.

In various examples, the model component 530 may send predictions from the one or more models 532 that may be used by the planning component 524 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 524 may determine one or more actions (e.g., reference actions and/or sub-actions) for the vehicle 502, such as vehicle candidate trajectories. In some examples, the model component 530 may be configured to determine whether an object occupies an occluded region based at least in part on the one or more actions for the vehicle 502. In some examples, the model component 530 may be configured to determine the actions that are applicable to the environment, such as based on environment characteristics, weather characteristics, or the like.

The model component 530 may generate sets of estimated states of the vehicle and one or more detected objects forward in the environment over a time period. The model component 530 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, the model component 530 may utilize physics and/or geometry based techniques, machine learning, linear temporal logic, tree search methods, heat maps, and/or other techniques for determining predicted trajectories and/or estimated positions of objects.

In various examples, the estimated states may be generated periodically throughout the time period. For example, the model component 530 may generate estimated states at 0.1 second intervals throughout the time period. For another example, the model component 530 may generate estimated states at 0.05 second intervals. The estimated states may be used by the planning component 524 in determining an action for the vehicle 502 to take in an environment.

In various examples, the model component 530 may utilize machine learned techniques to predict risks associated with occluded regions (e.g., probabilities of an object emerging to impact operation of the vehicle 502. In such examples, the machine learned algorithms may be trained to determine, based on sensor data and/or previous predictions by the model, that an object is likely to behave in a particular way relative to the vehicle 502 at a particular time during a set of estimated states (e.g., time period). In such examples, one or more of the vehicle 502 state (position, velocity, acceleration, trajectory, etc.) and/or the object state, classification, etc. may be input into such a machine learned model and, in turn, a behavior prediction may be output by the model.

In various examples, characteristics associated with each object type may be used by the model component 530 to determine an object velocity or acceleration. Examples of characteristics of an object type may include, but not be limited to: a maximum longitudinal acceleration, a maximum lateral acceleration, a maximum vertical acceleration, a maximum speed, maximum change in direction for a given speed, and the like As can be understood, the components discussed herein (e.g., the localization component 520, the perception component 522, the planning component 524, the one or more system controllers 526, the one or more maps 528, the model component 530 including the model(s) 532 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 502 and a secondary safety system that operates on the vehicle 502 to validate operation of the primary system and to control the vehicle 502 to avoid collisions.

In some instances, aspects of some or all of the components discussed herein may include any models, techniques, and/or machine learned techniques. For example, in some instances, the components in the memory 518 (and the memory 538, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 540, to the one or more computing device(s) 534 at a particular frequency, after a lapse of a predetermined period of time, in near real-time, etc.

The vehicle 502 may also include one or more emitters 508 for emitting light and/or sound. The emitters 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., remote computing device 534, other nearby vehicles, etc.) and/or one or more remote sensor system(s) 542 for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the planning component 524, the one or more system controllers 526, the one or more maps 528, and the model component 530, may process sensor data, as described above, and may send their respective outputs, over the one or more network(s) 540, to the computing device(s) 534. In at least one example, the localization component 520, the perception component 522, the planning component 524, the one or more system controllers 526, the one or more maps 528, and the model component 530 may send their respective outputs to the remote computing device(s) 534 at a particular frequency, after a lapse of a predetermined period of time, in near real-time, etc.

In some examples, the vehicle 502 may send sensor data to the computing device(s) 534 via the network(s) 540. In some examples, the vehicle 502 may receive sensor data from the computing device(s) 534 and/or remote sensor system(s) 542 via the network(s) 540. The sensor data may include raw sensor data and/or processed sensor data and/or representations of sensor data. In some examples, the sensor data (raw or processed) may be sent and/or received as one or more log files.

The computing device(s) 534 may include processor(s) 536 and a memory 538 storing the map component 544, a sensor data processing component 546, and a training component 548. In some examples, the map component 544 may include functionality to generate maps of various resolutions. In such examples, the map component 544 may send one or more maps to the vehicle computing device 504 for navigational purposes. In various examples, the sensor data processing component 546 may be configured to receive data from one or more remote sensors, such as sensor system(s) 506 and/or remote sensor system(s) 542. In some examples, the sensor data processing component 546 may be configured to process the data and send processed sensor data to the vehicle computing device 504, such as for use by the model component 530 (e.g., the model(s) 532). In some examples, the sensor data processing component 546 may be configured to send raw sensor data to the vehicle computing device 504.

In some instances, the training component 548 can include functionality to train a machine learning model to output probabilities for whether an occluded region is free of any objects or whether the occluded region is occupied by a static obstacle or a dynamic object. For example, the training component 548 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 548 may be executed by the processor(s) 536 to train the a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with occluded regions and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 548 can include functionality to train a machine learning model to output classification values. For example, the training component 548 can receive data that represents labelled collision data (e.g. publicly available data, sensor data, and/or a combination thereof). At least a portion of the data can be used as an input to train the machine learning model. Thus, by providing data where the vehicle traverses an environment, the training component 548 can be trained to output occluded value(s) associated with objects and/or occluded region(s), as discussed herein.

In some examples, the training component 548 can include training data that has been generated by a simulator. For example, simulated training data can represent examples where a vehicle collides with an object in an environment or nearly collides with an object in an environment, to provide additional training examples.

The processor(s) 516 of the vehicle 502 and the processor(s) 536 of the computing device(s) 534 may be any suitable processor capable of executing instructions to process data and perform operations as described herein. By way of example and not limitation, the processor(s) 516 and 536 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 538 are examples of non-transitory computer-readable media. The memory 518 and memory 538 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 534 and/or components of the computing device(s) 534 may be associated with the vehicle 502. That is, the vehicle 502 may perform one or more of the functions associated with the computing device(s) 534, and vice versa.

Figure 6A:
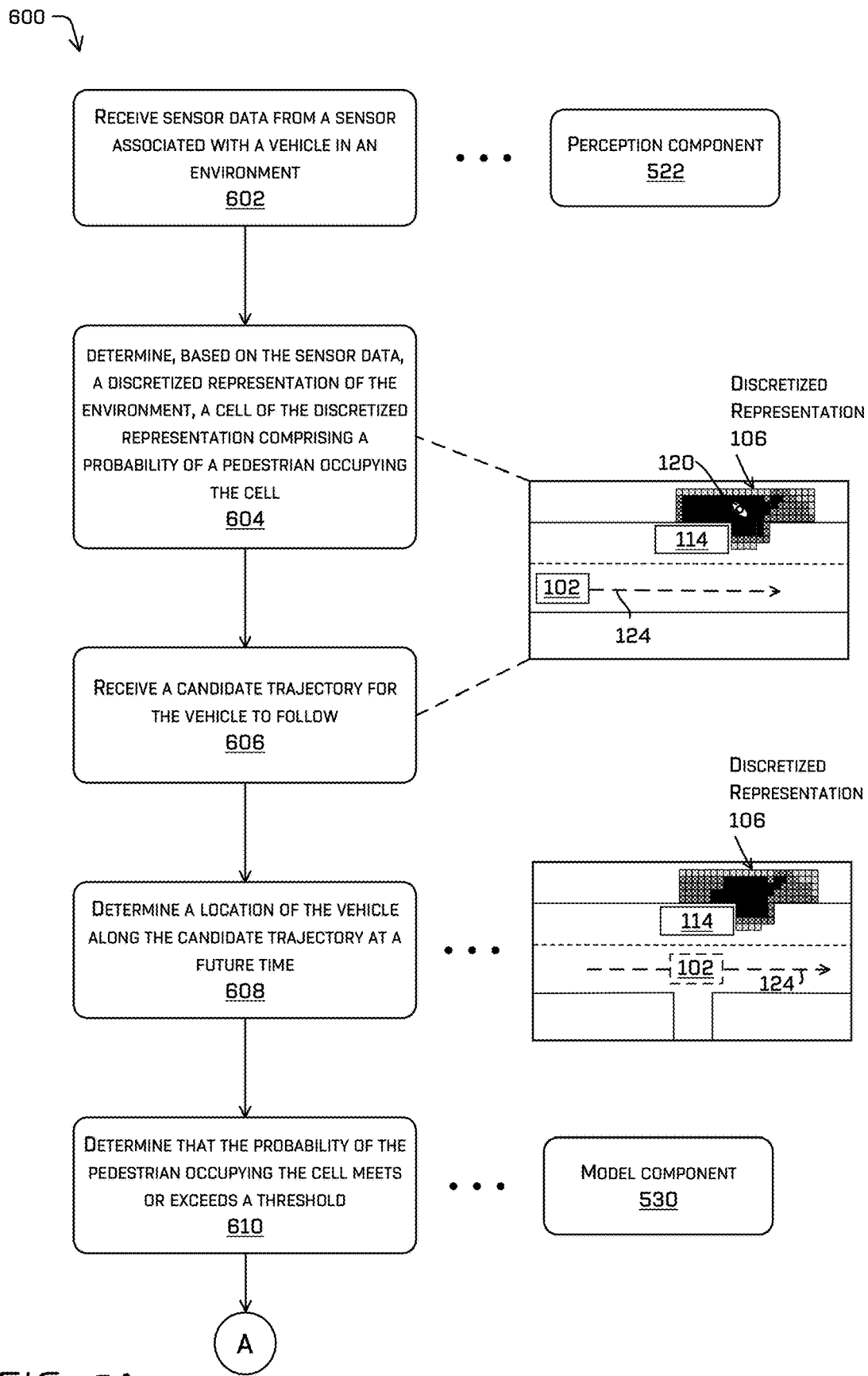
FIG. 6A is a first part of a flowchart depicting an example process for determining probability of intersection using one or more example models.

FIG. 6A is a first part of a flowchart depicting an example process 600 for determining probability of intersection using one or more example models. Some or all of the process 600 may be performed by one or more components in FIG. 5, as described herein. For example, some or all of process 600 may be performed by the vehicle computing device 504.

At operation 602, the process may include receiving sensor data from a sensor associated with a vehicle in an environment. For example, the model component 530 can receive sensor data from the perception component 522. The vehicle computing device may be configured to receive sensor data representing one or more objects in an environment. In some examples, the vehicle computing device may be configured to detect dynamic objects and/or static objects and combine the associated sensor data with map data. In some examples, the map data may represent fixed features of an environment including but not limited to crosswalks, traffic signals, school zones, and the like. In some examples, objects and/or occluded regions may be detected utilizing one or more heat maps. In various examples, the objects may be detected utilizing machine learned techniques. In such examples, one or more machine learned algorithms may be trained to determine if objects occupy occluded regions based on sensor data. In some examples, the objects may be detected utilizing temporal logic, and/or tree search methods.

At operation 604, the process may include determining, based at least in part on the sensor data, a discretized representation of the environment, a cell of the discretized representation comprising a probability of a pedestrian predicted to occupy the cell. For example, the model component 530 can determine the discretized representations 304, 306, 310, and/or 312 in FIG. 3. One or more cells of the discretized representation can overlap or otherwise be associated with occluded regions in the environment. Probabilities of the one or more cells can be compared to a threshold, and cells having a probability that meets or exceeds the threshold may be processed differently by the model than cells having a probability less than the threshold.

In some examples, the model component 530 can determine, as a determination, that a size of the occluded region meets or exceeds a threshold size. In such examples, the model component 530 can determine a probability of an object (e.g., a pedestrian) occupying the occluded region based at least in part on the determination.

In some examples, the model component 530 can determine that the one or more cells of a discretized representation is accessible to the vehicle by a road (e.g., a drivable envelope or region). If the cell is not accessible to the vehicle by the road, then the model component 530 can assign a lower probability of an object being present relative to another cell that is accessible to the vehicle by the road. In other words, the model component can include functionality to assign probabilities to cells based at least in part on whether a position of the cell is adjacent to a road.

In some examples, the model component 530 can combine or fuse a first discretized representation associated with a previous time with a second discretized representation associated with a current time (e.g., based on the sensor data), and may use the combined discretized representation to determine an output. In various examples, the model component 530 can associate data input into the model(s) 532 with linear temporal logic features and implement linear temporal logic to determine the output.

In some examples, the vehicle computing device can associate an object type of a potential object that may emerge from an occluded region. By way of example and not limitation, when an occluded region is near a crosswalk, the object type may be a pedestrian whereas when the occluded region is near an intersection, the object type may be a vehicle. Thus, the vehicle computing device may associate an object type with the occluded region based on a context of the occluded region relative to another static object (e.g., building, row of parked cars, and so on) and/or dynamic object. In some examples, a potential object type may be associated with the occluded region to predict an adverse behavior for the potential object. In various examples, the potential object may be assigned a velocity, acceleration, and/or trajectory that represents characteristics of the object type (e.g., a maximum acceleration for a pedestrian). The occluded region may also or instead be associated with a predetermined trajectory that indicates a speed and direction for a potential object to impact the vehicle without being associated with an object type. In some examples, the object trajectory and/or the predetermined trajectory associated with an occluded region may be determined based at least in part on characteristics of an object type associated with the occluded region. In various examples, the object type for an occluded region, may be based at least in part on a proximity of the occluded region to a crosswalk, a row of parked cars, a narrow road, an intersection, or a school zone, to just name a few.

At operation 606, the process may include receiving a candidate trajectory for the vehicle to follow. For instance, the planning component 524 can send a trajectory to the model 532 indicating an action the vehicle 502 can take in the future.

At operation 608, the process may include determining a location of the vehicle along the candidate trajectory at a future time. For instance, the model 532 can use simple dynamics to determine the location of the vehicle 502 along the trajectory provided by the planning component 524.

At operation 610, the process may include determining that the probability of the pedestrian occupying the cell meets or exceeds a threshold. For instance, the model component 530 can compare probabilit(ies) associated with cells of the discretized representation to a threshold value (e.g., representing an occupancy threshold or a size threshold) to identify cells that are unlikely to contain an object. For examples, cells (or occluded regions associated therewith) below an occupancy threshold may be omitted from further processing whereas cells that meet or exceed the threshold may be fused with other cells to generate a fused discretized representation.

Figure 6B:
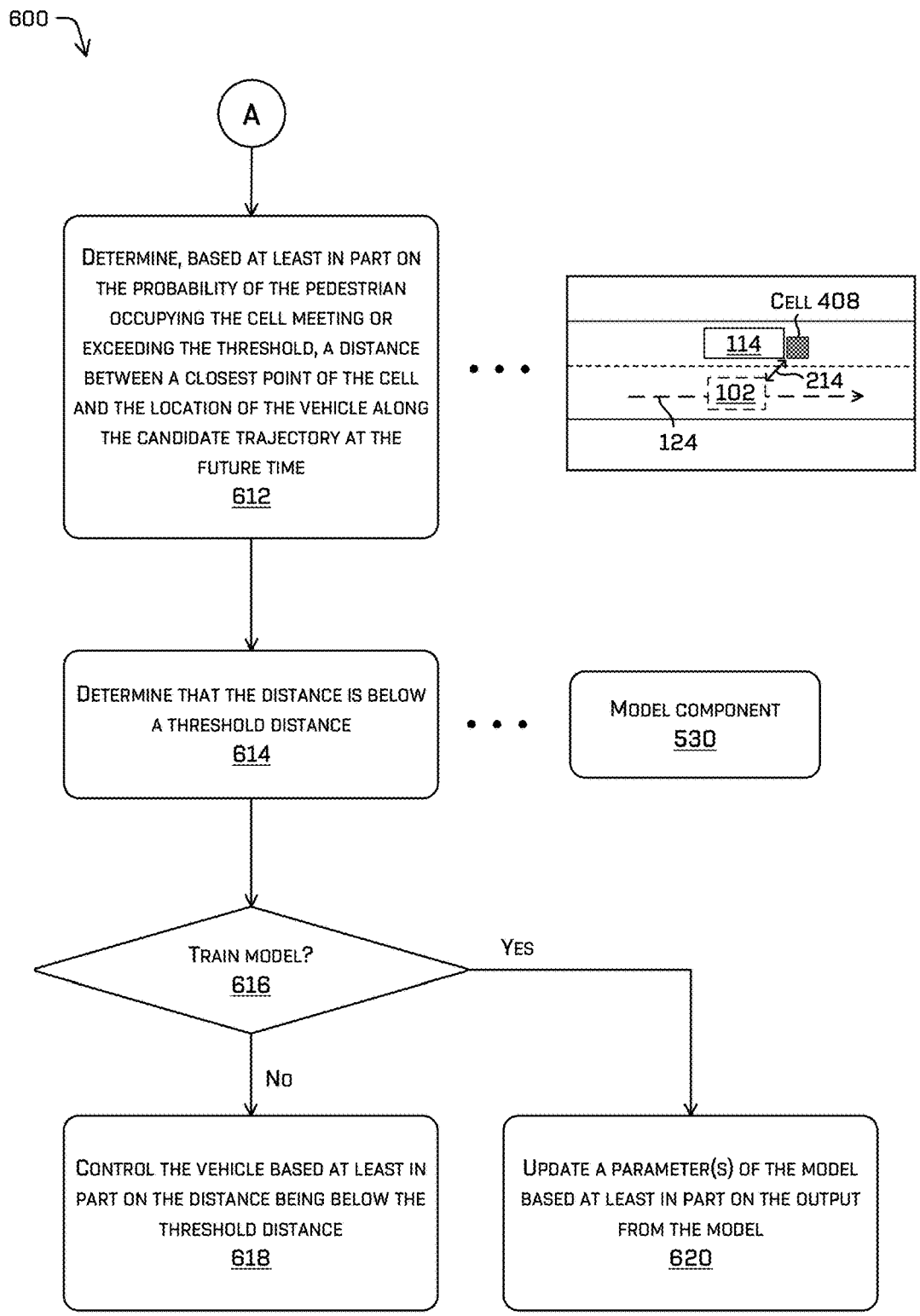
FIG. 6B is a second part of the flowchart depicting the example process for determining probability of intersection using one or more example models.

FIG. 6B is a second part of the flowchart depicting the example process 600 for determining a probability of an intersection using one or more example models.

At operation 612, the process may include determining, based at least in part on the probability of the pedestrian occupying the cell meeting or exceeding the threshold, a distance between a closest point of the cell (or occluded region) and the location of the vehicle along the candidate trajectory at the future time. For instance, the model component 530 can determine a distance from an occluded region associated with one or more cells based at least in part on the cells meeting or exceeding the threshold. In some examples, the model component 530 can associate the distance between the closest point of the cell (or occluded region) and the location of the vehicle along the candidate trajectory at the future time with a linear temporal logic feature, and determine the distance based at least in part on implementing linear temporal logic. In some examples, the model component 530 can determine an intersection point and/or an intersection time between the pedestrian (or occluded region associated therewith) and the location of the vehicle along the candidate trajectory at the future time.

By way of example and not limitation, the vehicle computing device may predict a distance to an occluded region based at least in part on characteristics of the object (e.g., maximum acceleration, maximum turning ability at a given speed, and so on) within the occluded region. Thus, an output from the model may improve vehicle safety by providing the vehicle with an adverse possibility that the object may take which enables the car to prepare for an adverse behavior (e.g., the maximum turning ability and/or the maximum acceleration of an object).

At operation 614, the process may include determining that the distance is below a threshold distance. For instance, the model component 530 can compare the distance to the threshold distance to identify occluded regions within a predetermined distance to the vehicle 502.

At operation 616, the process may include determining if a model is currently being trained, or whether the model has been trained previously. In some examples, a vehicle computing device may process data (sensor data, map data, image data, and so on) as part of a training operation, an inference operation, or a training operation and an inference operation in parallel. If the model is not being trained (e.g., "no" in the operation 616), the process can continue to operation 618 to cause operation of a vehicle to be controlled based at least in part on the output by the model. If the model is being trained (e.g., "yes" in the operation 616), the process continues to operation 620 to update a parameter(s) of the model based at least in part on the output by the model. Of course, in some examples, operations can be performed in parallel, depending on an implementation.

At operation 618, the process may include controlling the vehicle based at least in part on the distance being below the threshold distance. For example, an output from the model component 530 can be sent to the perception component 522 or the planning component 524, just to name a few. In various examples, controlling operation of the vehicle may be performed by a system of a vehicle, such as the planning component 524. The vehicle computing device may determine an additional candidate trajectory for the vehicle as an alternative to the candidate trajectory based at least in part on the predicted likelihood of the object occupying the occluded region, thereby improving vehicle safety by planning for the possibility that the object may emerge unexpectedly at a point in time. Additional details of controlling a vehicle using one or more outputs from one or more modes are discussed throughout the disclosure.

At the operation 620, one or more parameters of the model may be updated, altered, and/or augmented to train the model. In some instances, the output from the model component 530 can be compared against training data (e.g., ground truth representing labelled data) for use in training. Based at least in part on the comparison, parameter(s) associated with the model component 530 can be updated.

FIGS. 1, 6A, and 6B illustrate an example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operations 604 and 608 may be performed without operations 610, 612, and/or 614. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable storage media storing instructions that, when executed by the one or more processors, cause the system to perform operations comprising: receiving sensor data from a sensor associated with a vehicle in an environment; determining, based at least in part on the sensor data, a discretized representation of the environment, a cell of the discretized representation comprising a probability of a pedestrian occupying the cell; receiving a candidate trajectory for the vehicle to follow; determining a location of the vehicle along the candidate trajectory at a future time; determining that the probability of the pedestrian occupying the cell meets or exceeds a threshold; determining, based at least in part on the probability of the pedestrian occupying the cell meeting or exceeding the threshold, a distance between a closest point of the cell and the location of the vehicle along the candidate trajectory at the future time; determining that the distance is below a threshold distance; and controlling the vehicle based at least in part on the distance being below the threshold distance.

B: A system as paragraph A describes, the operations further comprising: downsampling, as a downsampled discretized representation, the discretized representation of the environment, wherein the probability of the pedestrian occupying the cell is based at least in part on the downsampled discretized representation.

C: A system as paragraphs A or B describe, wherein the discretized representation of the environment is a first discretized representation associated with a first time before the future time, and the operations further comprising: receiving a second discretized representation of the environment associated with a second time different than the first time; and fusing, as a fused representation, the first discretized representation and the second discretized representation of the environment; wherein determining the probability of the pedestrian occupying the cell is based at least in part on the fused representation.

D: A system as paragraphs A-C describe, wherein the cell is associated with an occluded region in the environment, and the operations further comprising: determining, as a determination, that a size of the occluded region meets or exceeds a threshold size, wherein determining that the probability of the pedestrian occupying the cell meets or exceeds the threshold is based at least in part on the determination.

E: A system as paragraphs A-D describe, the operations further comprising one or more of: determining an adversarial behavior of the pedestrian predicted to occupy the cell; determining that the cell is accessible to the vehicle by a road; associating the distance between the closest point of the cell and the location of the vehicle along the candidate trajectory at the future time with a temporal logic feature; or determining an intersection point and an intersection time between a predicted pedestrian and the location of the vehicle along the candidate trajectory at the future time; wherein controlling the vehicle is further based at least in part on at least one of the adversarial behavior of the pedestrian, the cell being accessible to the vehicle by the road, the temporal logic feature, or the intersection point and the intersection time.

F: One or more non-transitory computer-readable storage media storing instructions that, when executed, cause one or more processors to perform operations comprising: receiving first occlusion data associated with an occluded region in an environment of a vehicle; receiving second occlusion data associated with the occluded region in the environment, the second occlusion data associated with a different time than the first occlusion data; determining, based at least in part on the first occlusion data and the second occlusion data, a probability of an object occupying the occluded region; receiving a candidate trajectory for the vehicle to follow; determining, based at least in part on the probability, a distance between a closest point of the occluded region and a point of the vehicle along the candidate trajectory; and controlling operation of the vehicle based at least in part on the distance.

G: One or more non-transitory computer-readable storage media as paragraph F describes, wherein the first occlusion data or the second occlusion data comprises a discretized representation of the environment, and the operations further comprising: determining that the probability of the object occupying the occluded region meets or exceeds a threshold; wherein determining the distance between the closest point of the occluded region and a location of the vehicle along the candidate trajectory at a future time is further based at least in part on the probability of the object occupying the occluded region meeting or exceeding the threshold.

H: One or more non-transitory computer-readable storage media as paragraphs F or G describe, the operations further comprising: downsampling the first occlusion data, wherein the probability of the object occupying the occluded region is based at least in part on the downsampling.

I: One or more non-transitory computer-readable storage media as paragraphs F-H describe, the operations further comprising: fusing, as a fused representation, the first occlusion data and the second occlusion data; wherein determining the probability of the object occupying the occluded region is further based at least in part on the fused representation.

J: One or more non-transitory computer-readable storage media as paragraphs F-I describe, the operations further comprising: determining, as a determination, that a size of the occluded region meets or exceeds a threshold size, wherein determining that the probability of the object occupying the occluded region is based at least in part on the determination.

K: One or more non-transitory computer-readable storage media as paragraphs F-J describe, wherein the probability is a first probability, and the operations further comprising determining, based at least in part on the first occlusion data and the second occlusion data, a second probability that a second occluded region of the environment comprises an additional occluded region associated with an additional object; and identifying, based at least in part on the first probability and the second probability, one of the object of the occluded region or the additional object of the additional occluded region as having a greater likelihood of intersecting with the vehicle relative to the other of the object of the occluded region or the additional object of the additional occluded region, wherein controlling operation of the vehicle is further based at least in part on the identifying.

L: One or more non-transitory computer-readable storage media as paragraphs F-K describe, the operations further comprising at least one of: determining an adversarial behavior of the object predicted to occupy the occluded region; or determining that the occluded region is accessible to the vehicle by a road; wherein controlling the vehicle is further based at least in part on the adversarial behavior of the object or the occluded region being accessible to the vehicle by the road.

M: One or more non-transitory computer-readable storage media as paragraphs F-L describe, the operations further comprising: associating the distance between the closest point of the occluded region and a location of the vehicle along the candidate trajectory at a future time with a temporal logic feature; wherein controlling the vehicle is further based at least in part on associating the distance with the temporal logic feature.

N: One or more non-transitory computer-readable storage media as paragraphs F-M describe, the operations further comprising: determining an intersection time and an intersection point between the vehicle and the object at a future time based at least in part on features of the object comprising one or more of: a predetermined lateral acceleration, a predetermined longitudinal acceleration, a predetermined vertical acceleration, a predetermined speed, or a predetermined change in direction for a given speed; wherein controlling the vehicle is further based at least in part on the intersection point and the intersection time.

O: One or more non-transitory computer-readable storage media as paragraphs F-N describe, wherein determining the probability of the object occupying the occluded region is further based at least in part on an object type, an object orientation, an object size, or an occluded region size.

P: A method comprising: inputting, into a model, region data associated with an occluded region at a first time; inputting, into the model, a trajectory of a vehicle traversing an environment; receiving an output from the model indicating a probability that an object within the occluded region intersects with the vehicle at a second time; and controlling operation of the vehicle at the second time based at least in part on the probability.

Q: A method as paragraph P describes, wherein the region data is first region data, and further comprising: inputting, into the model, second region data associated the occluded region at a second time different from the first time; determining, based at least in part on the first region data and the second region data, a second probability that the occluded region comprises the object; wherein the probability that the object within the occluded region intersects with the vehicle at the second time is further based at least in part on the second probability that the occluded region comprises the object.

R: A method as paragraphs P or Q describe, further comprising: determining a predicted position of the object predicted to be in the occluded region; and determining a predicted velocity of the object; wherein the probability that the object within the occluded region intersects with the vehicle is further based at least in part on the predicted position of the object in the occluded region, the predicted velocity of the object, and the trajectory of the vehicle.

S: A method as paragraphs P-R describe, wherein the region data is first region data, and further comprising: inputting, into the model, second region data associated the occluded region at the second time different from the first time; fusing, as a fused representation, the first region data and the second region data; wherein the probability that the object within the occluded region intersects with the vehicle at the second time is further based at least in part on the fused representation.

T: A method as paragraphs P-S describe, further comprising: determining an object type associated with the object, wherein the probability that the object associated with the occluded region intersects with the vehicle is further based at least in part on the object type associated with the object.

While the example clauses described above are described with respect to one particular implementation, it should be understood that, in the context of this document, the content of the example clauses may also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable storage media storing instructions that, when executed by the one or more processors, cause the system to perform operations comprising:
receiving sensor data from a sensor associated with a vehicle in an environment;
determining, based at least in part on a first portion of the sensor data captured at a first time, a first discretized representation of an occluded portion of the environment associated with the first time, wherein the first discretized representation of the occluded portion comprises a first plurality of cells being regularly spaced and aligning with a road in the environment, the first plurality of cells having a plurality of first probabilities of a potential object occupying the first plurality of cells, wherein the first discretized representation of the occluded portion is associated with a first weight determined based at least in part on the first time;
determining, based at least in part on a second portion of the sensor data captured at a second time after the first time, a second discretized representation of the occluded portion of the environment associated with the second time, wherein the second discretized representation of the occluded portion comprises a second plurality of cells having a plurality of second probabilities of the potential object occupying the second plurality of cells, wherein the second discretized representation of the occluded portion is associated with a second weight determined based at least in part on the second time;
fusing, based on the first weight and the second weight, the first discretized representation of the occluded portion comprising the first plurality of cells having the plurality of first probabilities and the second discretized representation of the occluded portion comprising the second plurality of cells having the plurality of second probabilities to generate a fused representation of the occluded portion and excluding other portions of the environment, wherein the fused representation comprises a third plurality of cells having a plurality of third probabilities;
receiving a candidate trajectory for the vehicle to follow;
determining a location of the vehicle along the candidate trajectory at a future time;
determining, based at least in part on the fused representation, that a probability of the potential object occupying the occluded portion meets or exceeds a threshold;
determining, based at least in part on the probability of the potential object occupying the occluded portion meeting or exceeding the threshold, a distance between a closest point of the occluded portion and the location of the vehicle along the candidate trajectory at the future time;
determining that the distance is below a threshold distance; and
controlling the vehicle based at least in part on the distance being below the threshold distance.

2. The system of claim 1, the operations further comprising:
downsampling, as a downsampled fused representation, the fused representation, wherein the probability of the potential object occupying the occluded portion is based at least in part on the downsampled fused representation.

3. The system of claim 1, wherein the plurality of first probabilities of the potential object occupying the first plurality of cells is independent of the distance from the vehicle to the occluded portion.

4. The system of claim 1, the operations further comprising:
determining, as a determination, that a size of the occluded portion meets or exceeds a threshold size, wherein determining that the probability of the potential object occupying the occluded portion meets or exceeds the threshold is based at least in part on the determination.

5. The system of claim 1, the operations further comprising one or more of:
determining an adversarial behavior of the potential object predicted to occupy the occluded portion;
determining that the occluded portion is accessible to the vehicle by the road;
associating the distance between the closest point of the occluded portion and the location of the vehicle along the candidate trajectory at the future time with a temporal logic feature; or
determining an intersection point and an intersection time between a predicted potential object and the location of the vehicle along the candidate trajectory at the future time, wherein controlling the vehicle is further based at least in part on at least one of the adversarial behavior of the potential object, the occluded portion being accessible to the vehicle by the road, the temporal logic feature, or the intersection point and the intersection time.

6. The system of claim 1, the operations further comprising:
ranking, based on the plurality of third probabilities, the third plurality of cells of the fused representation; and
determining, based on the ranking, a cell of the third plurality of cells, wherein the distance between the closest point of the occluded portion and the location of the vehicle along the candidate trajectory is further determined based at least in part on a probability of the cell meeting or exceeding the threshold.

7. One or more non-transitory computer-readable storage media storing instructions that, when executed, cause one or more processors to perform operations comprising:
receiving, first occlusion data associated with a first occluded region in an environment of a vehicle, wherein the first occlusion data is associated with a first time and a first weight determined based at least in part on the first time;

receiving, second occlusion data associated with the first occluded region in the environment, the second occlusion data associated with a second time after the first time, wherein the second occlusion data is associated with a second weight determined based at least in part on the second time, wherein the second weight is higher than the first weight;

fusing, based at least in part on the first weight and the second weight, the first occlusion data and the second occlusion data, to generate fused data of the first occluded region and excluding other portions of the environment;

determining, based at least in part on the fused data, a first probability of an object occupying the first occluded region;

determining, based at least in part on the first occlusion data and the second occlusion data, a second probability that a second occluded region of the environment is associated with an additional object;

receiving a candidate trajectory for the vehicle to follow;

determining, based at least in part on the first probability, a distance between a closest point of the first occluded region and a point of the vehicle along the candidate trajectory;

identifying, based at least in part on the first probability and the second probability, one of the object of the first occluded region or the additional object of the second occluded region as having a greater likelihood of intersecting with the vehicle relative to the object of the first occluded region or the additional object of the second occluded region; and controlling operation of the vehicle based at least in part on the distance, wherein controlling the operation of the vehicle is further based at least in part on the identifying.

8. The one or more non-transitory computer-readable storage media of claim 7, the operations further comprising:
downsampling the first occlusion data, wherein the first probability of the object occupying the first occluded region is based at least in part on the downsampling.

9. The one or more non-transitory computer-readable storage media of claim 7, wherein the first occlusion data or the second occlusion data comprises a discretized representation of the environment, and the operations further comprise:
determining that the first probability of the object occupying the first occluded region meets or exceeds a threshold, wherein determining the distance between the closest point of the first occluded region and a location of the vehicle along the candidate trajectory at a future time is based at least in part on the first probability of the object occupying the first occluded region meeting or exceeding the threshold.

10. The one or more non-transitory computer-readable storage media of claim 7, the operations further comprising:
determining, as a determination, that a size of the first occluded region meets or exceeds a threshold size, wherein determining that the first probability of the object occupying the first occluded region is based at least in part on the determination.

11. The one or more non-transitory computer-readable storage media of claim 7, wherein determining the first probability of the object occupying the first occluded region is further based at least in part on at least one of an object type, an object orientation, an object size, or an occluded region size.

12. The one or more non-transitory computer-readable storage media of claim 7, the operations further comprising at least one of:
determining an adversarial behavior of the object predicted to occupy the first occluded region; or
determining that the first occluded region is accessible to the vehicle by a road, wherein controlling the vehicle is further based at least in part on the adversarial behavior of the object or the first occluded region being accessible to the vehicle by the road.

13. The one or more non-transitory computer-readable storage media of claim 7, the operations further comprising:
associating the distance between the closest point of the first occluded region and a location of the vehicle along the candidate trajectory at a future time with a temporal logic feature, wherein controlling the vehicle is further based at least in part on associating the distance with the temporal logic feature.

14. The one or more non-transitory computer-readable storage media of claim 7, the operations further comprising:
determining an intersection time and an intersection point between the vehicle and the object of the first occluded region at a future time based at least in part on features of the object comprising one or more of: a predetermined lateral acceleration, a predetermined longitudinal acceleration, a predetermined vertical acceleration, a predetermined speed, or a predetermined change in direction for a given speed, wherein controlling the vehicle is further based at least in part on the intersection point and the intersection time.

15. A method comprising:
inputting, into a model, first region data associated with an occluded region at a first time;
inputting, into the model, second region data associated with the occluded region, wherein the second region data is associated with a second time different from the first time;
inputting, into the model, a trajectory of a vehicle traversing an environment;
fusing, as a fused representation of the occluded region and excluding other regions of the environment, the first region data and the second region data;
receiving, from the model, a plurality of probabilities in a discretized grid, wherein individual ones of the plurality of probabilities represent a discrete probability that a potential object within the occluded region intersects with the vehicle at the second time, wherein the potential object is associated with an object class, and the discrete probability that the potential object within the occluded region intersects with the vehicle at the second time is based at least in part on the fused representation;
determining a potential adversarial behavior of the potential object, wherein the potential adversarial behavior of the potential object is determined based on one or more characteristics associated with the object class, and the one or more characteristics comprises one or more of a maximum velocity associated with the object class, a maximum acceleration associated with the object class, or a maximum turning ability associated with the object class; and controlling operation of the vehicle at the second time based at least in part on the plurality of probabilities and the potential adversarial behavior of the potential object.

16. The method of claim 15, further comprising:
determining that the occluded region is accessible to the vehicle by a road, wherein controlling the operation of the vehicle is further based at least in part on the occluded region being accessible to the vehicle by the road.

17. The method of claim 15, further comprising:
determining, based at least in part on the first region data and the second region data, a second probability that the occluded region comprises the potential object, wherein the discrete probability that the potential object within the occluded region intersects with the vehicle at the second time is further based at least in part on the second probability that the occluded region comprises the potential object.

18. The method of claim 15, further comprising:
determining a predicted position of the potential object predicted to be in the occluded region; and
determining a predicted velocity of the potential object, wherein the discrete probability that the potential object within the occluded region intersects with the vehicle is further based at least in part on the predicted position of the potential object in the occluded region, the predicted velocity of the potential object, and the trajectory of the vehicle.

19. The method of claim 15, further comprising:
associating a distance between a closest point of the occluded region and a location of the vehicle along a candidate trajectory at a future time with a temporal logic feature, wherein controlling the operation of the vehicle is further based at least in part on associating the distance with the temporal logic feature.

20. The method of claim 15, further comprising:
determining the object class associated with the potential object, wherein the discrete probability that the potential object associated with the occluded region intersects with the vehicle is further based at least in part on the object class associated with the potential object.

* * * * *